(12) United States Patent
Talarico et al.

(10) Patent No.: US 12,225,582 B2
(45) Date of Patent: Feb. 11, 2025

(54) CHANNEL ACCESS ENHANCEMENTS FOR ULTRA-RELIABLE LOW-LATENCY COMMUNICATION (URLLC) IN UNLICENSED SPECTRUM

(71) Applicant: Intel Corporation, Santa Clara, CA (US)

(72) Inventors: Salvatore Talarico, Los Gatos, CA (US); Sergey Panteleev, Maynooth (IE); Debdeep Chatterjee, San Jose, CA (US); Toufiqul Islam, Santa Clara, CA (US); Yongjun Kwak, San Diego, CA (US)

(73) Assignee: Intel Corporation, Santa Clara, CA (US)

(*) Notice: Subject to any disclaimer, the term of this patent is extended or adjusted under 35 U.S.C. 154(b) by 1 day.

(21) Appl. No.: 17/194,673

(22) Filed: Mar. 8, 2021

(65) Prior Publication Data

US 2021/0195643 A1   Jun. 24, 2021

Related U.S. Application Data

(60) Provisional application No. 63/121,771, filed on Dec. 4, 2020, provisional application No. 63/040,682, filed on Jun. 18, 2020, provisional application No. 62/989,302, filed on Mar. 13, 2020.

(51) Int. Cl.
*H04W 74/08* (2024.01)
*H04W 72/1268* (2023.01)
*H04W 74/00* (2009.01)
*H04W 74/0816* (2024.01)
*H04W 76/27* (2018.01)

(52) U.S. Cl.
CPC ... *H04W 74/0816* (2013.01); *H04W 72/1268* (2013.01); *H04W 74/004* (2013.01); *H04W 76/27* (2018.02)

(58) Field of Classification Search
None
See application file for complete search history.

(56) References Cited

U.S. PATENT DOCUMENTS

| | | |
|---|---|---|
| 2019/0230706 A1* | 7/2019 | Li ............................ H04B 7/088 |
| 2020/0037354 A1 | 1/2020 | Li et al. |
| 2020/0280971 A1 | 9/2020 | Moon et al. |
| 2021/0385863 A1 | 12/2021 | Fan et al. |
| 2022/0287096 A1 | 9/2022 | Talarico et al. |
| 2022/0377683 A1* | 11/2022 | Myung .................. H04L 5/0048 |

(Continued)

OTHER PUBLICATIONS

"U.S. Appl. No. 17/749,861, Non Final Office Action mailed Jul. 10, 2023", 21 pgs.

(Continued)

*Primary Examiner* — Pamit Kaur
(74) *Attorney, Agent, or Firm* — Schwegman Lundberg & Woessner, P.A.

(57) ABSTRACT

Embodiments of a user equipment (UE) configurable for unlicensed band operation in a 5G NR system (5GS), when operating in semi-static channel access mode, for a UE-initiated channel-occupancy time (COT), is configured to transmit an uplink (UL) transmission burst, as an initiating device, starting at a beginning of fixed frame period (FFP) and ending at a symbol before an idle period of the FFP after a successful clear-channel assessment (CCA).

19 Claims, 7 Drawing Sheets

(56) References Cited

U.S. PATENT DOCUMENTS

2023/0032015 A1* 2/2023 Xu ................. H04W 74/0808
2023/0055275 A1* 2/2023 Xu ................. H04W 74/0808

OTHER PUBLICATIONS

"U.S. Appl. No. 17/749,861, Final Office Action mailed Jan. 24, 2024", 27 pgs.
"U.S. Appl. No. 17/749,861, Response filed Feb. 20, 2024 to Final Office Action mailed Jan. 24, 2024", 10 pgs.
"U.S. Appl. No. 17/749,861, Non Final Office Action mailed Mar. 28, 2024", 21 pgs.
"U.S. Appl. No. 17/749,861, Response filed Jun. 11, 2024 to Non Final Office Action mailed Mar. 28, 2024", 10 pgs.
"U.S. Appl. No. 17/749,861, Response filed Oct. 10, 2023 to Non Final Office Action mailed Jul. 10, 2023", 11 pgs.

* cited by examiner

CHANNEL ACCESS ENHANCEMENTS FOR ULTRA-RELIABLE LOW-LATENCY COMMUNICATION (URLLC) IN UNLICENSED SPECTRUM

PRIORITY CLAIM

This application claims priority under 35 U.S.C. 119(e) to U.S. Provisional Patent Application Ser. No. 63/121,771, filed Dec. 4, 2020, U.S. Provisional Patent Application Ser. No. 63/040,682, filed Jun. 18, 2020, and U.S. Provisional Patent Application Ser. No. 62/989,302, filed Mar. 13, 2020, which are incorporated herein by reference in their entireties.

TECHNICAL FIELD

Embodiments pertain to wireless communications. Some embodiments relate to channel access in unlicensed spectrum in a fifth-generation (5G) new radio (NR) system. Some embodiments relate to ultra-reliable low-latency communication (URLLC).

BACKGROUND

The achievable latency and reliability performance of New Radio (NR) are keys to support use cases with tighter requirements. In order to extend the NR applicability in various verticals, Rel-16 NR evolved to support use cases including the following: Release 15 enabled use case improvements (for example, AR/VR (Entertainment industry)); and New Release 16 use cases with higher requirements (for example, factory automation, transport industry, and electrical power distribution).

However, in some of the scenarios listed above, one of the major limiting factors is still the availability in spectrum. To mitigate this, one of the objectives of Release 17 is to identify potential enhancements to ensure Release 16 feature compatibility with unlicensed band URLLC/industrial Internet of things (IIoT) operation in controlled environment. Ultra-reliable low-latency communication (URLLC) is one of several different types of use cases supported by the 5G New Radio (NR) standard.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Some embodiments are directed to a user equipment (UE) configurable for unlicensed band operation in a 5G NR system (5GS). In these embodiments, when operating in semi-static channel access mode for a UE-initiated channel-occupancy time (COT), the UE is configured to transmit an uplink (UL) transmission burst, as an initiating device, starting at a beginning of fixed frame period (FFP) and ending at a symbol before an idle period of the FFP after a successful clear-channel assessment (CCA).

In some embodiments, in the semi-static channel access mode, the UE is configured to decode dedicated radio-resource control (RRC) signalling received from a generation node B (gNB) to determine the FFP for the UE-initiated COT. In these embodiments, the FFP may have a periodicity comprising one of 1 millisecond (ms), 2 ms, 2.5 ms, 4 ms, 5 ms and 10 ms.

In some embodiments, the periodicity of the FFP for the UE-initiated COT (UE FFP) is configurable to be an integer multiple of or inter-factor of a periodicity of an FFP for a gNB-initiated COT (gNB FFP).

In some embodiments, an offset between the FFP for the UE-initiated COT (UE FFP) and the FFP for the gNB-initiated COT (gNB FFP) is a starting point of a first UE FFP relative to a radio frame boundary.

In some embodiments, when a configured UL transmission is aligned with a UE FFP boundary and ends before an idle period of the UE FFP, the UE is configured to assume that the scheduled UL transmission is to be performed as if the UE is the initiating device unless the scheduled UL transmission is confined within the gNB FFP before an idle period of the gNB FFP and the UE has determined that the gNB has initiated the gNB FFP.

In some embodiments, when the scheduled UL transmission is to start after the UE FFP boundary and ends before the idle period of the UE FFP, the UE is configured to assume that the scheduled UL transmission is to be performed as if the UE is the initiating device when the UE has already initiated the UE FFP by transmission of an earlier UL burst starting from the UE FFP boundary after successfully performing the CCA. In some embodiments, when the scheduled UL transmission is to start after the UE FFP boundary and is to end before the idle period of the UE FFP, the UE is configured to assume that the scheduled UL transmission corresponds to a gNB-initiated COT when the scheduled UL transmission is confined within a gNB FFP before the idle period of the gNB FFP and when the UE has determined that the gNB has initiated the gNB FFP.

In some embodiments, the UE may determine whether the scheduled UL transmission belongs to the UE-initiated COT or to the gNB-initiated COT based on whether the scheduled UL transmission is confined within the gNB FFP and ends before the following gNB's idle period, and whether the gNB FFP is active.

In these embodiments, for UL scheduled transmissions, the UE would 1) determine whether the scheduled UL transmission is confined within a gNB FFP and ends before the following gNB's idle period, and 2) assess whether that FFP is active, meaning that the gNB was able to acquire that FFP by succeeding the CCA procedure. If this is satisfied, then the UE would assume that the transmission would fall within a gNB-initiated COT. Otherwise, it would assume that the transmission would belong to a UE-initiated COT.

In some embodiments, the UE may perform a CCA within an idle period immediately before a start of the UE-initiated COT. In these embodiments, the UE may further be configured to perform a CCA before an UL transmission within the UE-initiated COT if a gap with a prior burst is larger than a predefined time period (e.g., 25 microseconds). In these embodiments, the UE is configured to assume that a CCA is successful if the channel is assessed to be idle within at least a predetermined observations period (e.g., 9 microseconds). In these embodiments, the CCA may be performed within the idle period of the UE's FFP, and right before the UE's initiated COT. Also, the CCA may be performed by a UE within the UE's initiated COT if the gap among different bursts is larger than 25 us.

In some embodiments, the UE may be configured to share a COT initiated by the gNB by transmitting the UL transmission burst within a predetermined time period (e.g., 16 microseconds) after detection of a downlink (DL) transmission burst within the COT initiated by the gNB without first performing the CCA.

In some embodiments, the UE may be configured to decode a system information block 1 (SIB1), the SIB1 include the FFP for the UE-initiated COT (UE FFP). In these embodiments, in response to the SIB1, the UE may be configured in the semi-static channel access mode when the SIB1 indicates an FFP for a gNB-initiated COT (gNB FFP). In these embodiments, the UE may be configured to operate as the initiating device when configured in the semi-static channel access mode and is to configure the UE to refrain from operating as the initiating device when not configured in the semi-static channel access mode.

These embodiments are described in more detail below.

The achievable latency and reliability performance of NR are keys to support use cases with tighter requirements. In order to extend the NR applicability in various verticals, Rel-16. NR evolved to support use cases including the following:

Release 15 enabled use case improvements
  Such as AR/VR (Entertainment industry)
New Release 16 use cases with higher requirements
  Factory automation
  Transport Industry
  Electrical Power Distribution However, in some of the scenarios listed above, one of the major limiting factors is still the availability in spectrum. To mitigate this, one of the objectives of Rel. 17 is to identify potential enhancements to ensure Release 16 feature compatibility with unlicensed band URLLC/IIoT operation in controlled environment.

While this WI is at its initial stage, it is important to identify aspects of the design that can be enhanced when operating in unlicensed spectrum. One of the challenges is that the system must comply with the regulatory requirements dictated for the sub-6 GHz band, where a listen before talk (LBT) procedure needs to be performed in some parts of the world to acquire the medium before a transmission can occur as described in ETSI EN 301 893, while still being able to guarantee the requirements in terms of reliability and latency identified for the design of URLLC/IIoT to meet the aforementioned use cases. Additional design considerations must be therefore made in this regards. In fact, when operating URLLC/IIoT in the unlicensed spectrum, due to the LBT procedure and its aleatory nature, additional latency and loss in reliability may be introduced depending on the medium contention when the LBT fails.

While during the NR-U WI, both a load based and frame based design have been designed to accommodate for different scenarios and the use of the LBT procedure, some additional changes must be made to this design in order to be able to accommodate and efficiently support in the same unlicensed bands the requirements and use cases that the URLLC/IIoT operation targets. It is also important to notice that for the URLLC/IIoT operation in the sub-6 GHz band, the deployments are constrained within a controlled environment, where the absence of other incumbent technologies can be guaranteed or may be very limited.

In this context, this disclosure provides details regarding the channel access mechanisms that may be supported to enable efficiently the operation of URLLC/IIoT operation on the unlicensed spectrum.

To enable URLLC/IIoT design within the sub-6 GHz band some modifications might be required to the NR-U channel access mechanisms to comply with all the regulatory requirements mandated by the ETSI BRAN, while efficiently supporting the requirements and use cases targeted. In this matter, the embodiments provide many details, and options that may help close this gap.

To enable URLLC/IIoT design within the sub-6 GHz band some modifications might be required to the NR-U channel access mechanisms to comply with all the regulatory requirements mandated by the ETSI BRAN, while efficiently supporting the requirements and use cases targeted. In this matter, these embodiments provide many details, and options that may help close this gap.

The major advantage is that if one or more embodiments disclosed herein are adopted by 3GPP NR standard, it is likely that most of the vendors will implement it in their products for compliance.

Enhancements to the Channel Access Mechanism

ETSI EN 301 893 defines the 5 GHz unlicensed band regulatory requirements for the EU. In this document, channel access mechanisms are defined for either load based equipment (LBE), or frame-based equipment (FBE). While LAA/eLAA/feLAA design have been developed for the channel access procedure that uses load based access, two separate designs have been supported for NR-U: i) the first design is based on the channel access procedure for load based access; ii) and the second design is instead based on the channel access procedure for frame based access.

For the LBE framework, the specific cases when a UE and a gNB can utilize Cat-2 and when they can utilize Cat-4, were agreed with the aim to guarantee a fair coexistence with other incumbent technologies. However, URLLC and IIoT are envisioned to be deployed when operating in the unlicensed spectrum only in a controlled environment, where the coexistence with other incumbent technologies may not be relevant anymore.

For the FBE framework, in order to exemplify the NR-U design it was agreed that only the gNB can be acting as an initiating device, and the starting positions of the fixed frame periods align with every even frame given that the fixed frame period (FFP) can be {1 ms, 2 ms, 2.5 ms, 4 ms, 5 ms, 10 ms}. However, this mode of operation may lead to very long delays when an LBT failure occurs at the gNB at the beginning of a FFP, since in this case all the DL and UL transmissions may need to be postponed to the following FFP for which a gNB is able to succeed its LBT procedure. Given that in URLLC/IIoT design a big emphasis has been put in restricting the latency, this mode of operation may need to be modified and the single point of failure at the gNB may need to be removed providing every device with more opportunities to transmit.

Therefore, moving forward in enabling URLLC and IIoT in the sub-6 GHz band, some additional considerations must be made in the channel access procedure in order to reduce as much as possible latency originating from LBT failures and possible contentions related to it.

In one embodiment, the LBE channel access procedure may be supported for URLLC/IIoT operating in the unlicensed spectrum. However, in order to reduce latency related to the LBT procedure itself, in the cases when Cat-4 LBT is required, only the lowest priority class value is used, where the lowest priority class value corresponds to the data of the highest priority. As an alternative, only Cat-2 LBT is supported given that the targeted scenario is for controlled environment where there is no presence of incumbent technology.

In one embodiment, the FBE channel access procedure may be supported for URLLC/IIoT operating in the unlicensed spectrum with one or more of the following variations:

In one embodiment, only the gNB may be allowed to operate as an initiating device and acquire a FFP during the idle period by performing a Cat-2 LBT.

In another embodiment, in order to enhance the flexibility to transmit to cope with the rare cases when there is an LBT failure, a UE is also allowed to operate as an initiating device for configured grant and/or grant based UL transmissions, and acquire its own FFP by performing a Cat-2 LBT.

Figure 1:
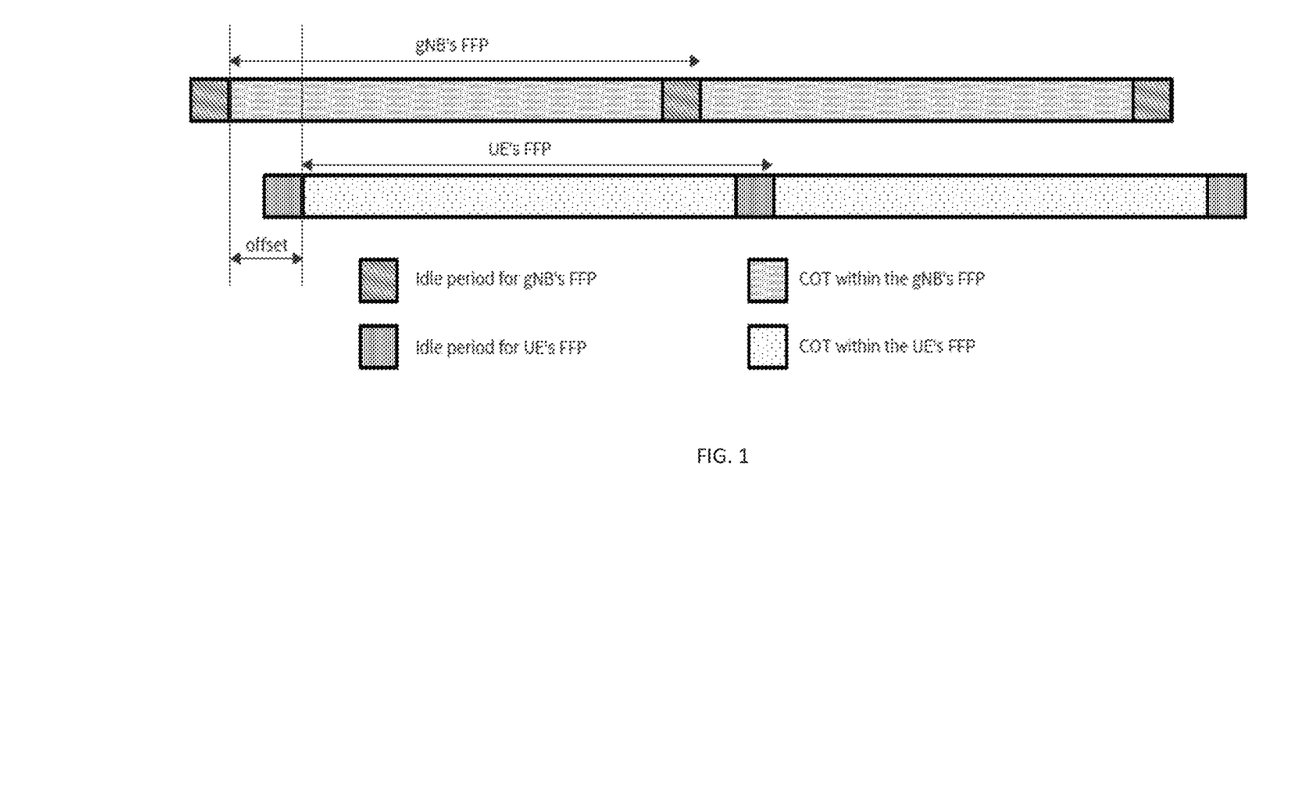
FIG. 1 illustrates offset between UE's and gNB's FFP in accordance with some embodiments.

In one option, the UE may operate as an initiating device independently of its associated gNB, and whether this succeeds and/or fails to acquire a FFP. In one embodiment, the value of FFP that a UE may assume for its COT acquisition is the same or may be different as that used by the gNB when the gNB is an initiating device, in this last case the value of the UE's FFP may be configured separately than that of the gNB's FFP. In one embodiment, the value of the FFP that the UE may use when operating as initiating device is the same as that configured in case a gNB operates as an initiating device. In this case, in one embodiment, a concept of offset may be introduced, which is relative to the start of the FFP for when a gNB operates as an initiating device, when the FFP for which the UE will operate as a initiating device would start—this is done so that to misalign the UE's and gNB's FFP, and their instance on when Cat-2 will be performed, so that to limit the contention and mutual blocking between the two. In one embodiment, the offset, which is the relative time distance between a UE's FFP and gNB's FFP, is defined as the relative time distance between the two FFPs when the gNB's FFP is aligned with the even indexed radio frame. If at the boundary of the even indexed radio frame, the starting position of the gNB's FFP and the UE's FFP is the same, then the offset is equal to zero. An illustration of this concept is provided in FIG. 1.

In one embodiment, the offset value can be predefined in the specification or configured by higher layers via NR remaining minimum system information (RMSI) or system information block1 (SIB1), NR other system information (OSI) or dedicated radio resource control (RRC) signaling. In one embodiment, if the offset can be configured, the set of values that the offset can assume can have a 25 us granularity, or a symbol or slot level granularity. In one embodiment, the offset may also assume negative values. In one embodiment, the offset value is defined based on the UE's capability and minimum time required to assess whether a gNB has not been able to acquire a specific FFP.

In one embodiment, the value of the offset may be UE specific, group specific or cell-specific.

Figure 2:
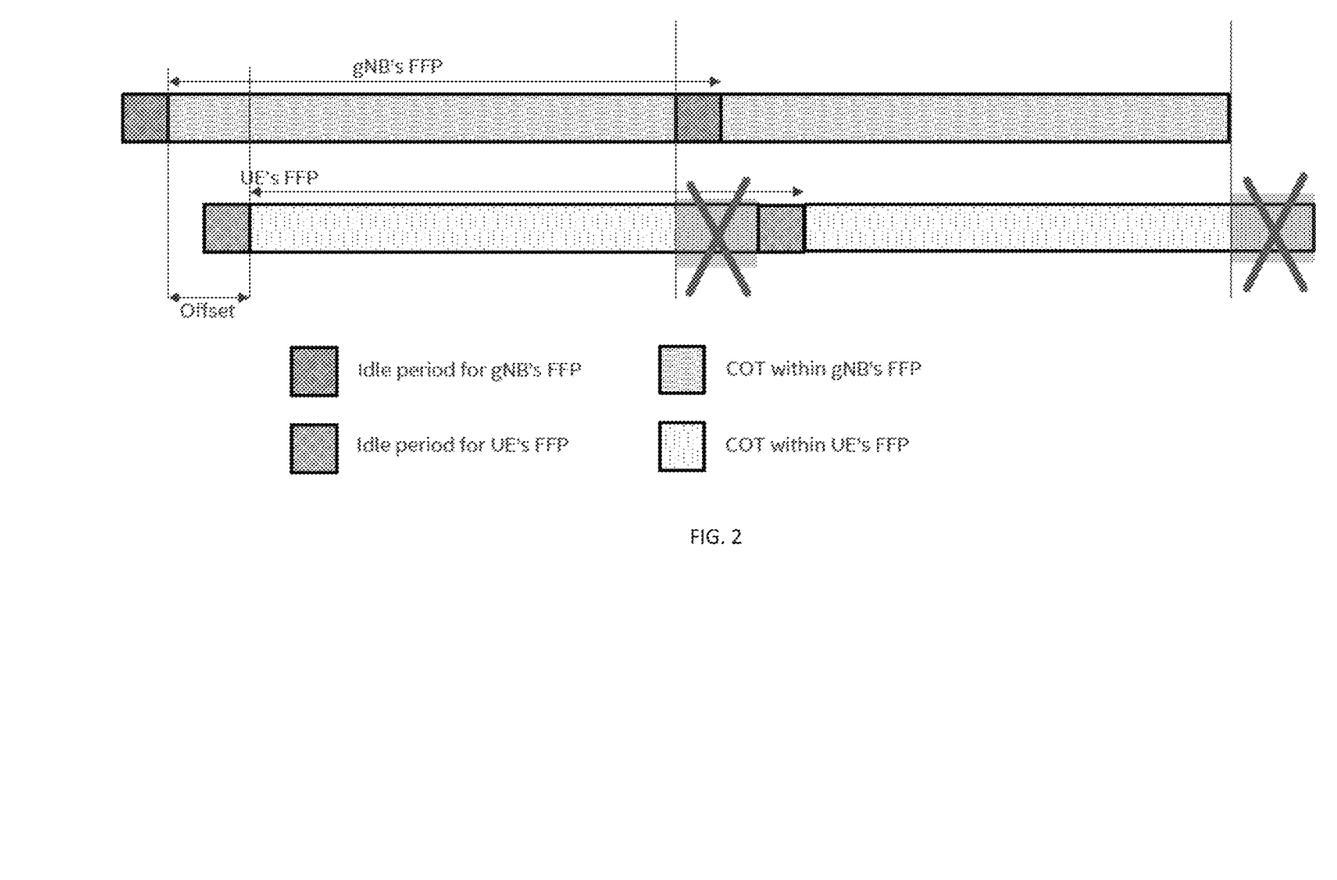
FIG. 2 illustrates the case when the UE's FFP is limited up to the gNB's idle period in accordance with some embodiments.

In one embodiment, a UE's FFP may never continue within the idle period of the gNB's FFP, in order to always give priority to the gNB to be the initiating device and further minimize possible contention between gNB and UEs, as illustrated by FIG. 2. In another embodiment, in order to improve further spectral efficiency, the UE's FFP may continue within the idle period of the gNB's FFP, but may be never allowed to overlap with the tail of the idle period where the gNB is expected to perform the LBT procedure to acquire the subsequent FFP (e.g. last 25 us of the idle period). In one embodiment, a gNB is not allowed to transmit within the idle period of a UE or within the tail of the idle period where the gNB is expected to perform the LBT procedure to acquire the subsequent FFP (e.g. last 25 us of the idle period), whether this operates as an initiating or a responding device. Notice that the embodiments listed here are not mutually exclusive, and one or more of them may apply together.

As a different option, in order to further reduce potential contention between the gNB and UE in operating as a initiating device, in another embodiment, a UE may be allowed to operate as an initiating device conditionally to the gNB failing to acquire the channel at the beginning of its FFP. In other words, within a gNB's FFP, a UE is allowed to operate as an initiating device only if the gNB has failed to acquire the channel for that FFP. In this case, the UE behavior may be as follows:

A UE monitors/attempt a detection of a DL transmission (e.g., GC-PDCCH, PSS/SSS, PBCH, DMRS, etc. . . . ) at the beginning of the FFP;

Once the UE assesses that the gNB has failed to acquire the channel and has not initiated a DL transmission within a FFP, the UE can perform as an initiating device, performs Cat-2 LBT procedure and initiates its own FFP or FFP(s) within this gNB's FFP.

Figure 3:
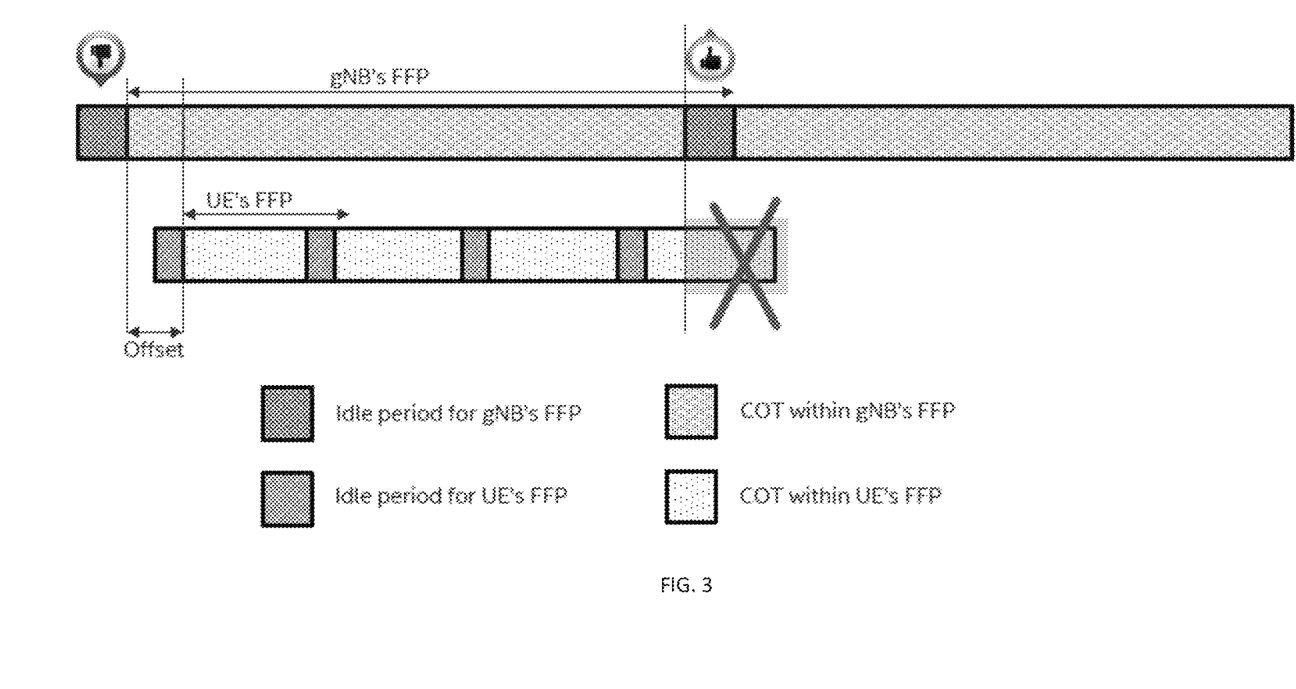
FIG. 3 illustrates offset between UE's and gNB's FFP and a burst of UE's FFPs conditionally to the gNB access to its own FFP in accordance with some embodiments.

The high-level concept of the above is provided in FIG. 3. As an additional embodiment, multiple UE's FFPs can be supported within a gNB's FFP for which a gNB has not been able to acquire the channel. In one embodiment, a UE's FFP may never fall or may never continue within the idle period of the gNB's FFP for which the channel access has failed, as illustrated in FIG. 3. In another embodiment, in order to improve further spectral efficiency, the UE's FFP may continue within the idle period of the gNB's FFP, but may be never allowed to overlap with the tail of the idle period where the gNB is expected to perform the LBT procedure to acquire the subsequent FFP (e.g. last 25 us of the idle period). In one embodiment, a gNB is not allowed to transmit within the idle period of a UE or within the tail of the idle period where the gNB is expected to perform the LBT procedure to acquire the subsequent FFP (e.g. last 25 us of the idle period), whether this operates as an initiating or a responding device.

Figure 4:
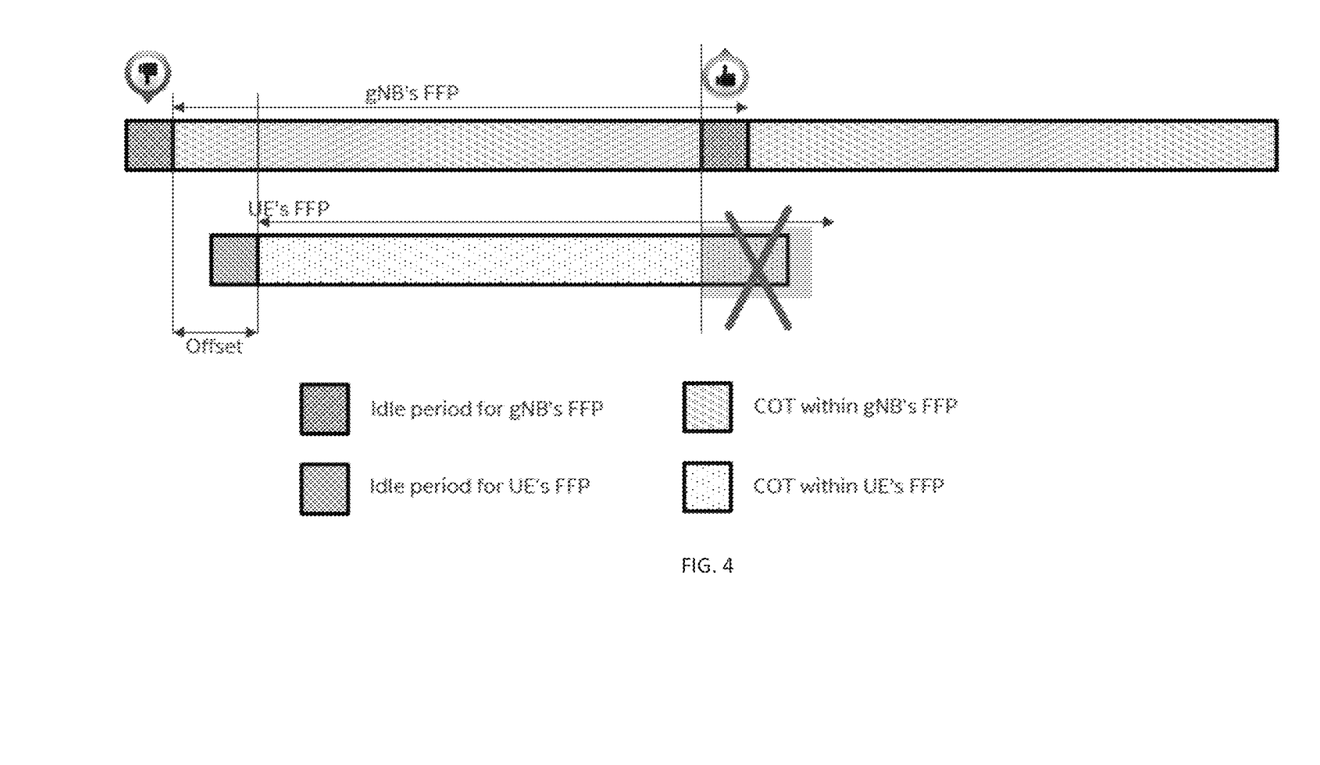
FIG. 4 illustrates offset between UE's and gNB's FFP, and single UE FFP conditionally to the gNB access to its own FFP with same FFP length between UE and gNB in accordance with some embodiments.

In one embodiment, the set of values of FFPs that a UE may assume are the same or may be different as that used when the gNB is an initiating device, and in this last case the value of the UE's FFP may be configured separately than that of the gNB's FFP. In one embodiment, the value of the FFP that the UE may use when operating as initiating device is the same as that configured in case a gNB operates as an initiating device, with the difference that the UE's FFP may not continue within the idle period of the gNB's FFP, as illustrated in FIG. 4.

In one embodiment, a concept of offset may be introduced, which indicates relative to the start of the FFP for which a gNB operates as an initiating device, when the set of FFPs or single UE FFP would start. An illustration of this concept is provided in both FIG. 3, and FIG. 4. In one embodiment, the offset value can be predefined in the specification or configured by higher layers via NR remaining minimum system information (RMSI) or system information block1 (SIB1), NR other system information (OSI) or dedicated radio resource control (RRC) signaling. In one embodiment, if the offset can be configured, the set of values that the offset can assume can have a 25 us granularity, or a symbol or slot level granularity. In one embodiment, the offset may also assume negative values. In one embodiment, the offset value is defined based on the UE's capability and minimum time required to assess whether a gNB has not been able to acquire a specific FFP. In one embodiment, the value of the offset may be UE specific, group specific or cell-specific. In one embodiment, the offset, which is the relative time distance between a UE's FFP and gNB's FFP, is defined as the relative time distance between the two FFPs when the gNB's FFP is aligned with the even indexed radio frame. If at the boundary of the even indexed radio frame, the starting position of the gNB's FFP and the UE's FFP is the same, then the offset is equal to zero.

In one embodiment, the value of the FFP that the UE may use when operating as initiating device is configured by higher layers via NR remaining minimum system information (RMSI) or system information block1 (SIB1), NR other system information (OSI) or dedicated radio resource control (RRC) signaling and this configuration is independent from the configuration of the value of the FFP that the gNB uses for operating as initiating device. In this case, if any idle periods or portions of it (e.g., last or first 25 us) are overlapped between UE and gNB, it is prioritized for the gNB, which means that gNB performs LBT during the idle period or last portion of it and UE does not perform the LBT during. Or if any idle periods are overlapped between UE and gNB, it is prioritized for the UE, which means that UE performs LBT and gNB does not perform the LBT during the idle period.

In one embodiment, for CG (Configured grant) UEs, the FFP length can be selected by the UE among a set of values, which are fixed or RRC configured, and once selected it will be indicated to the gNB within the CG-UCI of the PUSCH transmissions performed within the UE's FFP. In one embodiment, if a CG transmission is aligned with the UE's FFP boundaries and it ends before the idle period of that UE's FFP, then the UE assumes that the CG transmission occurs within the UE's initiated COT. In another embodiment, if a CG transmission is aligned with the UE's FFP boundaries and it ends before the idle period of that UE's FFP, then the UE assumes that the CG transmission occurs within the UE's initiated COT only if the UE determines that the gNB's FFP within which the UE's FFP lies is not valid, and the gNB has not being able to acquire its COT. Otherwise, the UE will assume it operates within the gNB's FFP. If a CG transmission is not aligned with the UE's FFP boundaries and it ends before the idle period of that UE's FFP, if the UE has already initiated a UE's FFP, then the UE would assume that the UL transmission will occur within the UE's initiated COT, otherwise if it determined that the gNB has acquired a FFP within which this UL transmission lies in, then it will assume that the transmission will occur within a gNB's initiated COT.

In one embodiment, the gNB configures or is able to indicate when activating a CG configuration whether that configured UL transmission can be operated either within a UE's or a gNB's initiated COT. In this matter, for instance.

For type 2 UL grant transmission, in DCI 0_0 and/or 0_1 and/or 0_2 an additional field is added or some unused bits are repurposed with the aim to indicate whether the activated UL grant transmission would need to be performed within or without a UE's initiated COT or whether the following UL transmission(s) are meant to be performed within a UE's FFP or not;

For type 1 UL grant transmission, an additional field is included within the information element ConfiguredGrantConfig with the aim to indicate whether the activated UL grant transmission would need to be performed within or without a UE's initiated COT.

If a CG UL transmission is configured or indicated to be operated within a UE's initiated COT, and if a CG transmission is aligned with the UE's FFP boundaries and it ends before the idle period of that UE's FFP, then the UE assumes that it will be operating within its own FFP, and would need to perform Cat-2 LBT right before the CG UL transmission starts.

If a CG UL transmission is not configured or indicated to be operated within a UE's initiated COT, and if a CG transmission is aligned with the UE's FFP boundaries and it ends before the idle period of that UE's FFP, then the UE assumes that the CG transmission occurs within the UE's initiated COT only if the UE determines that the gNB's FFP within which the UE's FFP lies is not valid, and the gNB has not being able to acquire its COT. Otherwise, the UE will assume it operates within the gNB's FFP.

In one embodiment, the values of the FFP that the UE can assume are dependent on the value of the FFP of the gNB. For instance, one or more of the following rules may be applied when choosing the set of lengths for the UE's FFPs: 1) the FFP of a UE, cannot be larger than the FFP of a gNB; 2) the UE's FFP is chosen so that the gNB's FFP length is an integer multiple of the UE's FFP and/or vice versa—for example if the FFP of the gNB is 10 ms, then the FFP of the UE can be 10 ms, 5 ms, 2.5 ms, 2 ms, and 1 ms; 3) the set of values that the UE's FFP can assume is one or more of the following values: {1 ms, 2 ms, 2.5 ms, 4 ms, 5 ms and 10 ms}; 4) the UE's FFP can also assume the value of 6 ms and 8 ms.

In one embodiment, in order to comply with the regulatory requirements, a UE's FFP may be formed by a COT and an idle period, where the idle period is 5% of the UE's FFP or the UE' COT, or 100 us, whichever is larger.

In one embodiment, once the UE assesses within a FFP that a gNB has not acquired the channel, then it can perform Cat-2 LBT and attempt a transmission within the gNB's FFP in multiple occasions corresponding to the beginning of a UE's FFP, unless the UE's FFP follows with the idle period of the gNB, where the transmission is not allowed.

Notice that the embodiments listed here are not mutually exclusive, and one or more of them may apply together.

Enhancements to the gNB's COT Sharing Procedure

Figure 5:
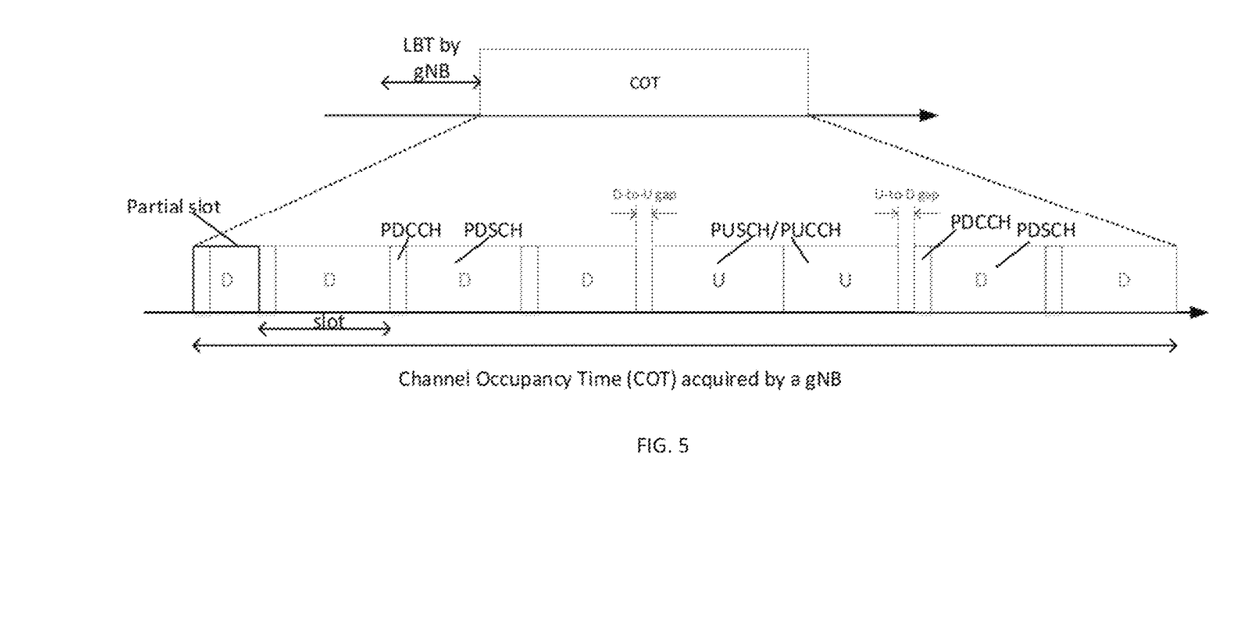
FIG. 5 illustrates a gNB's shared COT with multiple switching points in accordance with some embodiments.

According to the NR-U design, the gNB's is allowed to share its COT with a UE, and multiple switching points are allowed within a COT, as shown in FIG. 5. However, when the COT is shared with a CG UE, the gNB does not have any exact information from the UE regarding its resource utilization, and how many resources the UE will use for CG transmission since the UE's buffer information is unknown or UE may not transmit the resource due to the LBT failure. This has the draw back that the gNB would always need to assume that the gap between the UL and the DL would be larger than 16 us to be compliant with the regulatory requirements, and therefore perform either a Cat-2 or Cat-4 LBT to retransmit within its own COT if the previous UL transmission was a CG transmission. In the context of URLLC/IIoT operating in the unlicensed band, this procedure can be further improved with the aim to minimize the LBT procedures and enable the use of Cat-1 in this case.

Motivated by the above, in one embodiment, the CG-UCI content is modified so that the CG UE indicates the exact time domain resource utilization within the gNB's COT sharing so that to enable Cat-1/CAT-2 LBT. For one option, additional n bits (e.g. n=2, 3, 4, or 5 bits) are added within the CG-UCI with the scope to indicate the number of slot, symbols or PUSCH transmissions whose length is provided by the SLIV that the UE will utilize/perform, which may be decremented as we move toward the end of the UL burst or may be indicated only in a specific instance in time. In a different option, a single bit is added which indicates whether the N bits carried on top of HARQ process number, redundancy version and NDI, are actually used for UE's COT sharing information or to indicate the exact time domain resource utilization within the gNB's COT sharing.

In one embodiment, the resource utilization or simply the channel acquisition by the UE can be also indicated for non-CG transmissions, which is scheduled by the gNB. If the UL transmission is transmitted inside gNB's COT, additional UCI is included in the UL transmission, indicating the resource utilization or explicit channel acquisition by the UE.

Enhancements to the UE's COT Sharing Procedure

In NR-U, the UE is allowed to share its COT with a gNB, and multiple switching points are allowed within a COT. However, based on whether the ED threshold used by the UE to initially acquire the COT is provided by the gNB or not, two mode of operation were defined:

Mode A: The ED threshold is configured by the gNB, and the UE is allowed to share its COT with the gNB, where the gNB may transmit both control and data transmission.

Mode B: The ED threshold is not configured by the gNB, and the UE is allowed to share its COT only for the purpose of DL control transmission for the length of 2/4/or 8 OFDM symbol for 15/30 or 60 KHz subcarrier spacing, respectively.

Regardless of whether mode A or made B is used, the UE provides indication to the gNB regarding an offset value which indicates from where the gNB can start the transmission. However, this offset indication points to the first symbol of the first slot starting from which a gNB is allowed to transmit. This has the drawback that if the UE terminates its UL burst not exactly at the slot level, a gap larger than 16 us will be left between the UL and the DL, meaning that the gNB would need to perform a Cat-2 LBT before transmitting within the UE's COT. In the context of URLLC/IIoT operating in the unlicensed band, this procedure can be further improved with the aim to minimize the LBT procedures and facilitate the use of CAT-1 LBT.

Motivated by the above, in one embodiment, the UE's COT sharing is supported, and the gNB may be allowed to perform both control and data transmission independently of ED threshold that was used to acquire the COT given that the use of the URLLC/IIoT feature is restricted in controlled environments where coexistence with other incumbent technologies may not be a concern. In one embodiment, both mode A and mode B are supported. In one embodiment, only mode A is supported.

In one embodiment, regardless of the modality of operation which is supported, the UE initiating the COT uses always the ED threshold configured by the gNB, if any, or in alternative given that URLLC-u is envisioned for controlled environments, the UE may always calculate the ED threshold to use in its the channel access procedure based on its own transmit power as detailed in 37.213 Sec. 4.2.3. In another embodiment, the ED threshold configured by the gNB is only used when a value is configured by the gNB and also when the UE intends to share its COT.

Figure 6:
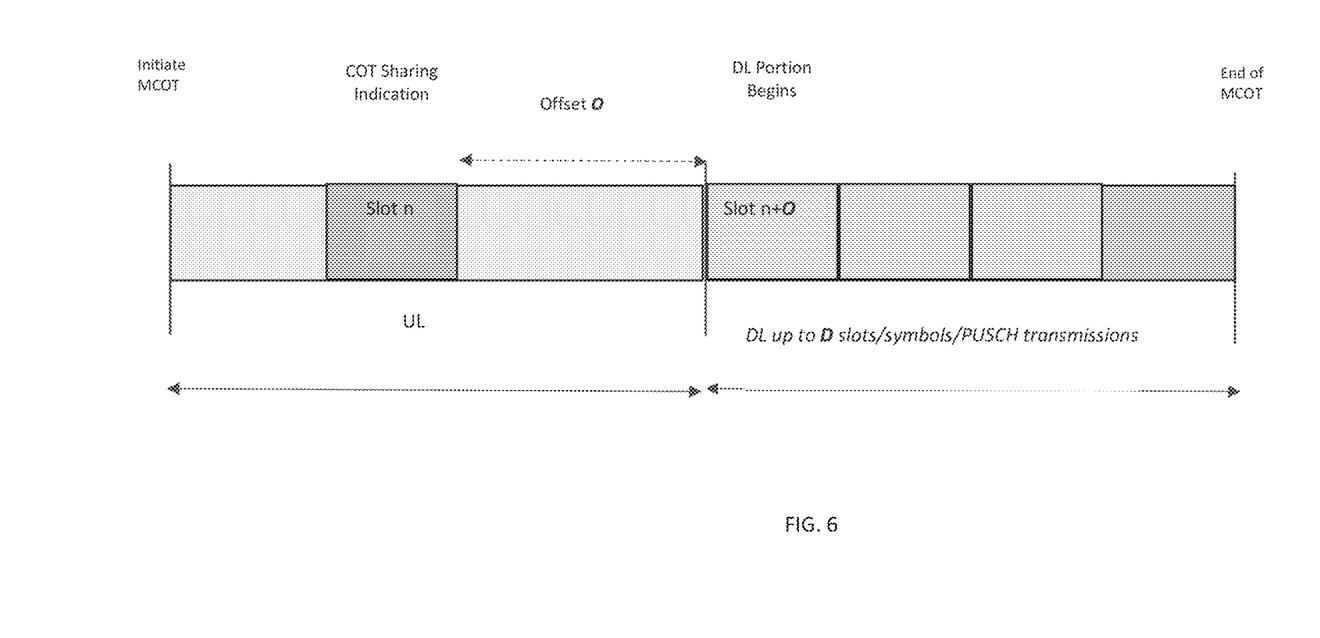
FIG. 6 illustrates a UE's COT sharing mechanism in accordance with some embodiments.

In one embodiment, regardless of the modality of operation which is supported, the concept/definition of offset is modified, so that the offset points always from the first symbol after the end of the UL burst to the first symbol that the gNB can utilize for DL transmission independently on whether this symbol is at the slot boundary or not. In this case, the offset is defined in granularity of symbols/slots/or PUSCH length corresponding to the latest value indicated by the SLIV for the specific UL burst or UL transmission carrying that information, as illustrated in FIG. 6.

This disclosure provides details regarding the channel access procedure for an URLLC system operating in unlicensed spectrum.

In one example, the LBE channel access procedure may be supported for URLLC/IIoT operating in the unlicensed spectrum. In the cases when Cat-4 LBT is required, only the lowest priority class value is used, where the lowest priority class value corresponds to the data of the highest priority.

In one example, the LBE channel access procedure may be supported for URLLC/IIoT operating in the unlicensed spectrum with Cat-2 LBT In one example, the FBE channel access procedure may be supported for URLLC/IIoT operating in the unlicensed spectrum with one or more of the following variations:
 a. only the gNB may be allowed to operate as an initiating device and acquire a FFP during the idle period by performing a Cat-2 LBT.
 b. in order to enhance the flexibility to transmit to cope with the rare cases when there is an LBT failure, a UE is also allowed to operate as an initiating device for configured grant and/or grant based UL transmissions, and acquire its own FFP by performing a Cat-2 LBT.

In one example, the UE may operate as an initiating device independently of its associated gNB, and whether this succeeds and/or fails to acquire a FFP.

In one example, the value of FFP that a UE may assume for its COT acquisition is the same or may be different as that used by the gNB when the gNB is an initiating device.

In one example, the value of the FFP that the UE may use when operating as initiating device is the same as that configured in case a gNB operates as an initiating device.

In one example, a concept of offset may be introduced, which is relative to the start of the FFP for when a gNB operates as an initiating device, when the FFP for which the UE will operate as an initiating device would start.

In one example, the offset value can be predefined in the specification or configured by higher layers via NR remaining minimum system information (RMSI) or system information block1 (SIB1), NR other system information (OSI) or dedicated radio resource control (RRC) signaling.

In one example, if the offset can be configured, the set of values that the offset can assume can have a 25 us granularity, or a symbol or slot level granularity.

In one example, the offset value is defined based on the UE's capability and minimum time required to assess whether a gNB has not been able to acquire a specific FFP.

In one example, a UE's FFP may never continue within the idle period of the gNB's FFP.

In one example, the UE's FFP may continue within the idle period of the gNB's FFP, but may be never allowed to overlap with the tail of the idle period where the gNB is expected to perform the LBT procedure to acquire the subsequent FFP (e.g. last 25 us of the idle period).

In one example, a UE may be allowed to operate as an initiating device conditionally to the gNB failing to acquire the channel at the beginning of its FFP.

In one example, multiple UE's FFPs can be supported within a gNB's FFP for which a gNB has not been able to acquire the channel.

In one example, a UE's FFP may never fall or may never continue within the idle period of the gNB's FFP for which the channel access has failed.

In one example, the UE's FFP may continue within the idle period of the gNB's FFP, but may be never allowed to overlap with the tail of the idle period where the gNB is expected to perform the LBT procedure to acquire the subsequent FFP (e.g. last 25 us of the idle period).

In one example, the set of values of FFPs that a UE may assume are the same or may be different as that used when the gNB is an initiating device.

In one example, the value of the FFP that the UE may use when operating as initiating device is the same as that configured in case a gNB operates as an initiating device, with the difference that the UE's FFP may not continue within the idle period of the gNB's FFP.

In one example, a concept of offset may be introduced, which indicates relative to the start of the FFP for which a gNB operates as an initiating device, when the set of FFPs or single UE FFP would start.

In one example, the offset value can be predefined in the specification or configured by higher layers via NR remaining minimum system information (RMSI) or system information block1 (SIB1), NR other system information (OSI) or dedicated radio resource control (RRC) signaling. In one embodiment, if the offset can be configured, the set of values that the offset can assume can have a 25 us granularity, or a symbol or slot level granularity.

In one example, the offset value is defined based on the UE's capability and minimum time required to assess whether a gNB has not been able to acquire a specific FFP.

In one example, the value of the FFP that the UE may use when operating as initiating device is configured by higher layers via NR remaining minimum system information (RMSI) or system information block1 (SIB1), NR other system information (OSI) or dedicated radio resource control (RRC) signaling and this configuration is independent from the configuration of the value of the FFP that the gNB uses for operating as initiating device.

In one example, for CG (Configured grant) UEs, the FFP length can be selected by the UE among a set of values, which are fixed or RRC configured, and once selected it will be indicated to the gNB within the CG-UCI of the PUSCH transmissions performed within the UE's FFP.

In one example, the values of the FFP that the UE can assume are dependent on the value of the FFP of the gNB. For instance, one or more of the following rules may be applied when choosing the set of lengths for the UE's FFPs:
1) the FFP of a UE, cannot be larger than the FFP of a gNB;
2) the UE's FFP is chosen so that the gNB's FFP length is an integer multiple of the UE's FFP—for example if the FFP of the gNB is 10 ms, then the FFP of the UE can be 5 ms, 2.5 ms, 2 ms, and 1 ms. In one embodiment, in order to comply with the regulatory requirements, a UE's FFP may be formed by a COT and an idle period, where the idle period is 5% of the UE's FFP or the UE' COT, or 100 us, whichever is larger.

In one example, once the UE assesses within a FFP that a gNB has not acquired the channel, then it can perform Cat-2 LBT and attempt a transmission within the gNB's FFP in multiple occasions corresponding to the beginning of a UE's FFP, unless the UE's FFP follows with the idle period of the gNB, where the transmission is not allowed.

In one example, the CG-UCI content is modified so that the CG UE indicates the exact time domain resource utilization within the gNB's COT sharing so that to enable Cat-1/CAT-2 LBT. For one option, additional n bits (e.g. n=2, 3, 4, or 5 bits) are added within the CG-UCI with the scope to indicate the number of slot, symbols or PUSCH transmissions whose length is provided by the SLIV that the UE will utilize/perform, which may be decremented as we move toward the end of the UL burst or may be indicated only in a specific instance in time. In a different option, a single bit is added which indicates whether the N bits carried on top of HARQ process number, redundancy version and NDI, are actually used for UE's COT sharing information or to indicate the exact time domain resource utilization within the gNB's COT sharing.

In one example, the resource utilization or simply the channel acquisition by the UE can be indicated for non-CG transmissions, which is scheduled by the gNB. If the UL transmission is transmitted inside gNB's COT, additional UCI is included in the UL transmission, indicating the resource utilization or explicit channel acquisition by the UE.

In one example, the UE's COT sharing is supported, and the gNB may be allowed to perform both control and data transmission independently of ED threshold that was used to acquire the COT given that the use of the URLLC/IIoT feature is restricted in controlled environments where coexistence with other incumbent technologies may not be a concern.

In one example, regardless of the modality of operation which is supported, the concept/definition of offset is modified, so that the offset points always from the first symbol after the end of the UL burst to the first symbol that the gNB can utilize for DL transmission independently on whether this symbol is at the slot boundary or not. In this case, the offset is defined in granularity of symbols/slots/or PUSCH length corresponding to the latest value indicated by the SLIV for the specific UL burst or UL transmission carrying that information.

Figure 7:
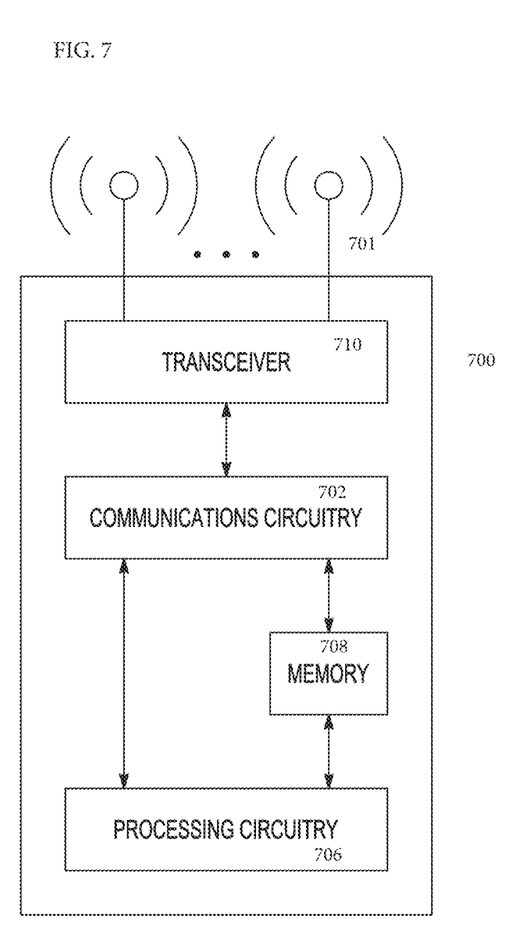
FIG. 7 illustrates a functional block diagram of a user equipment (UE) in accordance with some embodiments.

FIG. 7 illustrates a functional block diagram of a communication station (e.g., a user equipment (UE)) in accordance with some embodiments. The communication station 700 may also be suitable for use as a gNB, handheld device, a mobile device, a cellular telephone, a smartphone, a tablet, a netbook, a wireless terminal, a laptop computer, a wearable computer device, a femtocell, a high data rate (HDR) subscriber station, an access point, an access terminal, or other personal communication system (PCS) device.

The communication station 700 may include communications circuitry 702 and a transceiver 710 for transmitting and receiving signals to and from other communication stations using one or more antennas 701. The communications circuitry 702 may include circuitry that can operate the physical layer (PHY) communications and/or medium access control (MAC) communications for controlling access to the wireless medium, and/or any other communications layers for transmitting and receiving signals. The communication station 700 may also include processing circuitry 706 and memory 708 arranged to perform the operations described herein. In some embodiments, the communications circuitry 702 and the processing circuitry 706 may be configured to perform operations detailed in the above figures, diagrams, and flows.

In accordance with some embodiments, the communications circuitry 702 may be arranged to contend for a wireless medium and configure frames or packets for communicating over the wireless medium. The communications circuitry 702 may be arranged to transmit and receive signals. The communications circuitry 702 may also include circuitry for modulation/demodulation, upconversion/downconversion, filtering, amplification, etc. In some embodiments, the processing circuitry 706 of the communication station 700 may include one or more processors. In other embodiments, two or more antennas 701 may be coupled to the communications circuitry 702 arranged for sending and receiving signals. The memory 708 may store information for configuring the processing circuitry 706 to perform operations for configuring and transmitting message frames and performing the various operations described herein. The memory 708 may include any type of memory, including non-transitory memory, for storing information in a form readable by a machine (e.g., a computer). For example, the memory 708 may include a computer-readable storage device, read-only memory (ROM), random-access memory (RAM), magnetic disk storage media, optical storage media, flash-memory devices and other storage devices and media.

In some embodiments, the communication station 700 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable computer device, or another device that may receive and/or transmit information wirelessly.

In some embodiments, the communication station 700 may include one or more antennas 701. The antennas 701 may include one or more directional or omnidirectional antennas, including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting station.

In some embodiments, the communication station 700 may include one or more of a keyboard, a display, a non-volatile memory port, multiple antennas, a graphics processor, an application processor, speakers, and other mobile device elements. The display may be an LCD screen including a touch screen.

Although the communication station 700 is illustrated as having several separate functional elements, two or more of the functional elements may be combined and may be implemented by combinations of software-configured elements, such as processing elements including digital signal processors (DSPs), and/or other hardware elements. For example, some elements may include one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the communication station 700 may refer to one or more processes operating on one or more processing elements.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus of a user equipment (UE) configurable for unlicensed band operation in a fifth-generation new radio (SG NR) system (5GS), the apparatus comprising: processing circuitry; and memory,
    wherein when operating in semi-static channel access mode, the processing circuitry is configured to:
    decode downlink control information (DCI) that schedules an uplink grant for a physical uplink shared channel (PUSCH), the DCI indicating whether the uplink grant is to be performed with a UE-initiated channel-occupancy time (COT) or with a generation Node B (gNB) initiated COT that is to be shared with the UE,
    wherein when the DCI indicates that the uplink grant is to be performed for the VE initiated COT, the processing circuitry is configured to cause the UE to transmit an uplink (UL) transmission burst carrying the PUSCH, as an initiating device, starting at a beginning of fixed frame period (FFP) and ending at a symbol before an idle period of the FFP after a successful clear-channel assessment (CCA),
    wherein when the DCI indicates that the uplink grant is to be performed with the gNB-initiated COT that is to be shared with the UE, the processing circuitry is configured to cause the UE to transmit the UL transmission burst carrying the PUSCH within a predetermined time period after detection of a downlink (DL) transmission burst within the gNB-initiated COT without first performing the CCA,
    wherein the UL transmission burst within the gNB-initiated COT indicates a time-domain resource utilization by the UE within the gNB-initiated COT.

2. The apparatus of claim 1, wherein in the semi-static channel access mode, the processing circuitry is configured to:
    decode radio-resource control (RRC) signalling received from a generation node B (gNB) to determine the FFP for the UE-initiated COT, the FFP having a periodicity comprising one of 1 millisecond (ms), 2 ms, 2.5 ms, 4 ms, Sms and 10 ms.

3. The apparatus of claim 2, wherein the periodicity of the FFP for the UE-initiated COT (UE FFP) is configurable to be an integer multiple of or inter-factor of a periodicity of an FFP for the gNB-initiated COT (gNB FFP).

4. The apparatus of claim 3, wherein an offset between the FFP for the UE-initiated COT (UE FFP) and the FFP for the gNB-initiated COT (gNB FFP) is a starting point of a first UE FFP relative to a radio frame boundary.

5. The apparatus of claim 4, wherein when a configured UL transmission is aligned with a UE FFP boundary and ends before an idle period of the UE FFP, the UE is configured to assume that a scheduled UL transmission is to be performed as if the UE is the initiating device unless:
- the scheduled UL transmission is confined within the gNB FFP before an idle period of the gNB FFP; and
- the UE has determined that the gNB has initiated the gNB FFP.

6. The apparatus of claim 5, wherein when the scheduled UL transmission is to start after the UE FFP boundary and ends before the idle period of the UE FFP, the UE is configured to assume that the scheduled UL transmission is to be performed as if the UE is the initiating device when the UE has already initiated the UE FFP by transmission of an earlier UL burst starting from the UE FFP boundary after successfully performing the CCA; and
wherein when the scheduled UL transmission is to start after the UE FFP boundary and ends before the idle period of the UE FFP, the UE is configured to assume that the scheduled UL transmission corresponds to a gNB-initiated COT when the scheduled UL transmission is confined within the gNB FFP before the idle period of the gNB FFP and when the UE has determined that the gNB has initiated the gNB FFP.

7. The apparatus of claim 5, wherein the processing circuitry is configured to determine whether the scheduled UL transmission belongs to the UE-initiated COT or to the gNB-initiated COT based on whether the scheduled UL transmission is confined within the gNB FFP and ends before an idle period of the gNB-initiated COT, and whether the gNB FFP 1s active.

8. The apparatus of claim 1, wherein the processing circuitry is to configure the UE to perform a CCA within an idle period immediately before a start of the UE-initiated COT, and
wherein the processing circuitry is to further configure the UE to perform the CCA before an UL transmission within the UE-initiated COT if a gap with a prior burst is larger than a predefined time period, and
wherein the UE is configured to assume that the CCA is successful if the channel is assessed to be idle within at least a predetermined observations period.

9. The apparatus of claim 1, wherein the processing circuitry is configured to decode a system information block 1 (SIB1), the SIB1 to include the FFP for the UE-initiated COT (UE FFP),
wherein in response to the SIB1, the processing circuitry is to configure the UE in the semi-static channel access mode when the SIB1 indicates an FFP for the gNB-initiated COT (gNB FFP), and
wherein the processing circuitry is to configure the UE to operate as the initiating device when configured in the semi-static channel access mode and is to configure the UE to refrain from operating as the initiating device when not configured in the semi-static channel access mode.

10. A non-transitory computer-readable storage medium that stores instructions for execution by processing circuitry of a user equipment (UE) configurable for unlicensed band operation in a 5G NR system (5GS),
wherein when operating in semi-static channel access mode, the processing circuitry is configured to:
decode downlink control information (DCI) that schedules an uplink grant for a physical uplink shared channel (PUSCH), the DCI indicating whether the uplink grant is to be performed with a UE-initiated channel-occupancy time (COT) or with a generation Node B (gNB) initiated COT that is to be shared with the UE,
wherein when the DCI indicates that the uplink grant is to be performed for the VE initiated COT, the processing circuitry is configured to cause the UE to transmit an uplink (UL) transmission burst carrying the PUSCH, as an initiating device, starting at a beginning of fixed frame period (FFP) and ending at a symbol before an idle period of the FFP after a successful clear-channel assessment (CCA),
wherein when the DCI indicates that the uplink grant is to be performed with the gNB-initiated COT that is to be shared with the UE, the processing circuitry is configured to cause the UE to transmit the UL transmission burst carrying the PUSCH within a predetermined time period after detection of a downlink (DL) transmission burst within the gNB-initiated COT without first performing the CCA,
wherein the UL transmission burst within the gNB-initiated COT indicates a time-domain resource utilization by the UE within the gNB-initiated COT.

11. The non-transitory computer-readable storage medium of claim 10, wherein in the semi-static channel access mode, the processing circuitry is configured to:
decode radio-resource control (RRC) signalling received from a generation node B (gNB) to determine the FFP for the UE-initiated COT, the FFP having a periodicity comprising one of 1 millisecond (ms), 2 ms, 2.5 ms, 4 ms, Sms and 10 ms.

12. The non-transitory computer-readable storage medium of claim 11, wherein the periodicity of the FFP for the UE-initiated COT (UE FFP) is configurable to be an integer multiple of or inter-factor of a periodicity of an FFP for the gNB-initiated COT (gNB FFP).

13. The non-transitory computer-readable storage medium of claim 12, wherein an offset between the FFP for the UE-initiated COT (UE FFP) and the FFP for the gNB-initiated COT (gNB FFP) is a starting point of a first UE FFP relative to a radio frame boundary.

14. The non-transitory computer-readable storage medium of claim 13, wherein when a configured UL transmission is aligned with a UE FFP boundary and ends before an idle period of the UE FFP, the UE is configured to assume that a scheduled UL transmission is to be performed as if the UE is the initiating device unless:
- the scheduled UL transmission is confined within the gNB FFP before an idle period of the gNB FFP; and
- the UE has determined that the gNB has initiated the gNB FFP.

15. The non-transitory computer-readable storage medium of claim 14, wherein when the scheduled UL transmission is to start after the UE FFP boundary and ends before the idle period of the UE FFP, the UE is configured to assume that the scheduled UL transmission is to be performed as if the UE is the initiating device when the UE has already initiated the UE FFP by transmission of an earlier UL burst starting from the UE FFP boundary after successfully performing the CCA; and
wherein when the scheduled UL transmission is to start after the UE FFP boundary and ends before the idle period of the UE FFP, the UE is configured to assume that the scheduled UL transmission corresponds to the gNB-initiated COT when the scheduled UL transmission is confined within a gNB FFP before the idle period of the gNB FFP and when the UE has determined that the gNB has initiated the gNB FFP.

16. The non-transitory computer-readable storage medium of claim 14, wherein the processing circuitry is configured to determine whether the scheduled UL transmission belongs to the UE-initiated COT or to the gNB-initiated COT based on whether the scheduled UL transmission is confined within the gNB FFP and ends before an idle period of the gNB-initiated COT, and whether the gNB FFP is active.

17. The non-transitory computer-readable storage medium of claim 10, wherein the processing circuitry is to configure the UE to perform a CCA within an idle period immediately before a start of the UE-initiated COT, and
wherein the processing circuitry is to further configure the UE to perform the CCA before an UL transmission within the UE-initiated COT if a gap with a prior burst is larger than a predefined time period, and
wherein the UE is configured to assume that the CCA is successful if the channel is assessed to be idle within at least a predetermined observations period.

18. An apparatus of a generation node B (gNB) configurable for unlicensed band operation in a 5G NR system (5GS), the apparatus comprising: processing circuitry; and memory,
wherein the processing circuitry is configured to encode a system information block 1 (SIB1), the SIB1 encoded to include a fixed frame period (FFP) for a user equipment (UE) UE-initiated channel-occupancy time (COT) (UE FFP);
wherein to configure the UE to operate in a semi-static channel access mode, the processing circuitry is to encode the SIB1 to further indicate an FFP for a gNB-initiated COT (gNB FFP),
wherein the processing circuitry is further configured to encode downlink control information (DCI) that schedules an uplink grant for a physical uplink shared channel (PUSCH), the DCI indicating whether the uplink grant is to be performed with the UE-initiated channel-occupancy time (COT) or with the gNB initiated COT that is to be shared with the UE;
wherein when the DCI is encoded to indicate that the uplink grant is to be performed for the UE initiated COT, and when the UE is configured to operate in the semi-static channel access mode, the gNB is configured to receive an uplink (UL) transmission burst from the UE operating as an initiating device, the UL transmission burst starting at a beginning of the UE FFP after a successful clear-channel assessment (CCA) by the UE,
wherein when the DCI is encoded to indicate that the uplink grant is to be performed with the gNB-initiated COT that is to be shared with the UE, the processing circuitry is to configure the gNB to receive the UL transmission burst carrying the PUSCH within a predetermined time period after detection of a downlink (DL) transmission burst within the gNB-initiated COT without first performing the CCA,
wherein the UL transmission burst within the gNB-initiated COT indicates a time-domain resource utilization by the UE within the gNB-initiated COT.

19. The apparatus of claim 18, wherein the FFP for the UE-initiated COT has a periodicity comprising one of 1 millisecond (ms), 2 ms, 2.5 ms, 4 ms, 5 ms and 10 ms.

* * * * *